July 17, 1934.　　　W. J. S. JONES　　　1,966,982

MEANS FOR MEASURING AND DISPENSING SUBSTANCES SUCH AS SUGAR

Filed July 11, 1932

Inventor
William J. S. Jones.
By Sommers & Young Attys.

Patented July 17, 1934

1,966,982

UNITED STATES PATENT OFFICE 1,966,982

MEANS FOR MEASURING AND DISPENSING SUBSTANCES SUCH AS SUGAR

William Joseph Sylvester Jones, Coogee, near Sydney, New South Wales, Australia

Application July 11, 1932, Serial No. 621,967
In Australia July 17, 1931

2 Claims. (Cl. 221—98)

This invention relates to a device for measuring and dispensing a predetermined quantity of granular substance such as sugar.

At the present time it is the practice in some hotels, boarding houses, restaurants, and like places where meals are served, to provide a common sugar basin from which sugar is taken by guests or other persons as required.

Unfortunately some persons use the spoon provided for them to stir their tea, or other beverage, for the purpose of helping themselves to sugar, and very often place their spoon into the sugar after the former has been in their mouth.

The above practice is not hygienic, and it is principally to obviate this, that the present invention has been devised.

A further object of the invention is to provide a container for sugar or the like, into which it is impossible for a person to insert a spoon, but which may be readily and conveniently manipulated to supply the desired quantity of sugar or the like by a measuring and dispensing action.

The invention comprises a container having a cap or lid adapted to be detachably secured thereon, said lid being provided with an orifice into which a dispensing tube is fitted, said dispensing tube leading to a measuring chamber.

The dispensing tube is preferably enlarged at the lower end forming a tapered or conical wall with an opening at the lower end to allow of entrance of the sugar or the like.

The measuring chamber is formed by disposing a sleeve around the conical portion of the dispensing tube.

In order that the invention may be more readily understood, reference will now be made to the accompanying drawing, wherein:—

Figure 1:
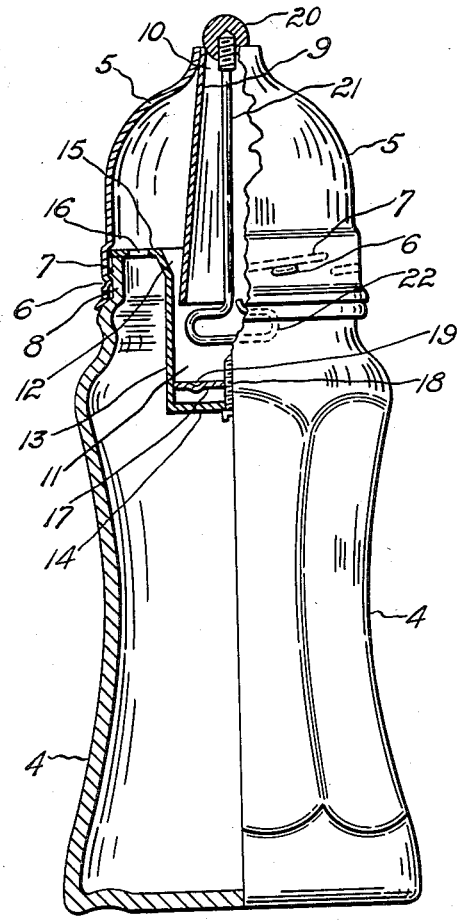
Figure 1 is a part sectional elevation illustrating the present invention.
Figure 2:
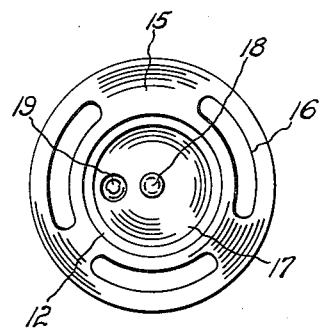
Figure 2 is a plan view of the measuring chamber showing the slots through which the substance, henceforth referred to as sugar, passes from the container into the cap and also showing the adjusting disc whereby the quantity of sugar measured, is varied.
Figure 3:
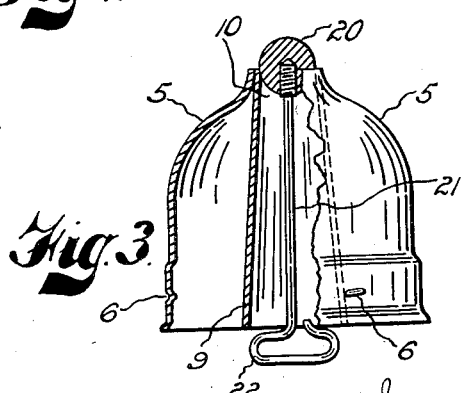
Figure 3 is a part sectional elevation illustrating the cap and the dispensing tube.

The invention is illustrated in the accompanying drawing and comprises a container 4 preferably of glass to which the lid or cap 5 is firmly secured by the engagement of detents 6 in the cap with inclined ribs 7 formed on the neck 8 of the container 4.

The cap 5 is provided with a dispensing tube 9 which extends upwardly to an orifice 10 formed in the cap 5. The lower end of the dispensing tube 9 enters a measuring chamber 11 in such manner as to leave an annular space 12 through which sugar may enter the said chamber from the cap. To prevent ants and other insects from entering the container when not in use and also to provide means for agitating the sugar in the measuring chamber, I mount a ball 20 upon a rod 21 in the dispensing tube 9 and form a loop 22 upon the end of the said rod 21.

The measuring chamber 11 illustrated in the drawing has a tubular portion 13 closed by a bottom portion 14, said tubular portion also having a flange 15 by which it is supported upon the neck 8 of the container. The flange 15 is provided with slotted openings 16 through which the sugar passes to the cap 5 on reversing the container.

To adjust the quantity of sugar received in the measuring chamber 11 the latter may be provided with a false bottom 17 which is screwed upon a threaded stem 18 in the form of a screw sweated to the bottom portion 14. The false bottom 17 is provided with a recess 19 into which a pointed tool may be inserted when it is desired to turn the false bottom 17 upon the threaded stem 18 to vary the capacity of the measuring chamber.

In operation with the container 4 in its normal upright position, the sugar that has passed into the cap 5 through the slots 16 passes through the annular space 12 adjacent to the dispensing tube 9 and fills the measuring chamber 11. When it is desired to remove a predetermined quantity of sugar, dependent upon the adjustment of the measuring chamber, the container 4 is reversed, whereupon the contents of the measuring chamber 11 pass through the dispensing tube 9 and fall from the container. At the same time a further quantity of sugar enters the cap 5 through the slots 16 preventing the measured quantity of sugar from leaving the measuring chamber by the annular space 12 through which the measuring chamber is filled when in the normal upright position. Each time a predetermined quantity of sugar is required it is necessary to place the container in its normal position and then reverse it.

I claim.

1. A device for measuring and dispensing substances such as sugar, comprising a container having a neck provided with inclined ribs, a cap provided with detents for engaging the inclined ribs, said cap having a dispensing tube and a tubular measuring chamber closed at the lower end, said dispensing tube being enlarged at the lower end to allow of entry of sugar therein from the said measuring chamber, a false bottom adjustably mounted in the measuring chamber for determining the quantity of sugar to be measured, the measuring chamber being supported by a flange having slotted openings through which the sugar passes from the container to the cap on reversing the container, said flange being disposed between the cap and the neck of the container, and a rod in the dispensing tube for agitating the sugar in the measuring chamber, said rod having a ball thereon for operating the rod and for closing the outlet from the dispensing tube.

2. A device for measuring and dispensing substances such as sugar, comprising a container having a neck provided with inclined ribs, a cap provided with detents for engaging the inclined ribs, said cap having a dispensing tube and a tubular measuring chamber closed at the lower end, said dispensing tube being enlarged at the lower end to allow of entry of sugar therein from the said measuring chamber, a screw-threaded stem extending upwardly from the lower end of the measuring chamber, a false bottom in the measuring chamber adjustably mounted on said stem and having a recess therein into which a pointed tool may be inserted for adjusting the said false bottom on the threaded stem for varying the capacity of the measuring chamber, the measuring chamber being supported by a flange having slotted openings through which the sugar passes from the container to the cap on reversing the container, said flange being disposed between the cap and the neck of the container, and a rod in the dispensing tube for agitating the sugar in the measuring chamber, said rod having a ball thereon for operating the rod and for closing the outlet from the dispensing tube.

WILLIAM JOSEPH SYLVESTER JONES.